Aug. 11, 1936.  E. FAVARY  2,050,694
ROAD GUARD
Filed July 3, 1934
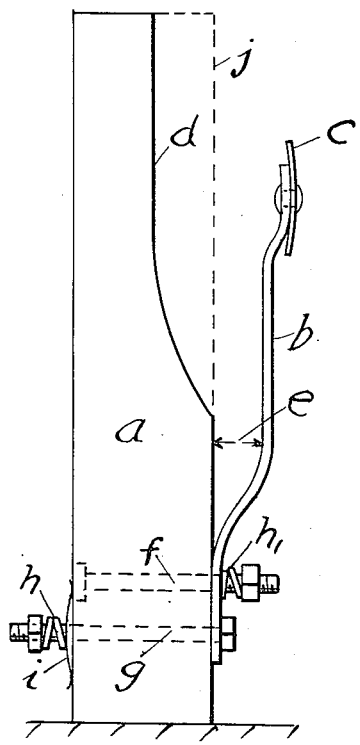
Fig. 1
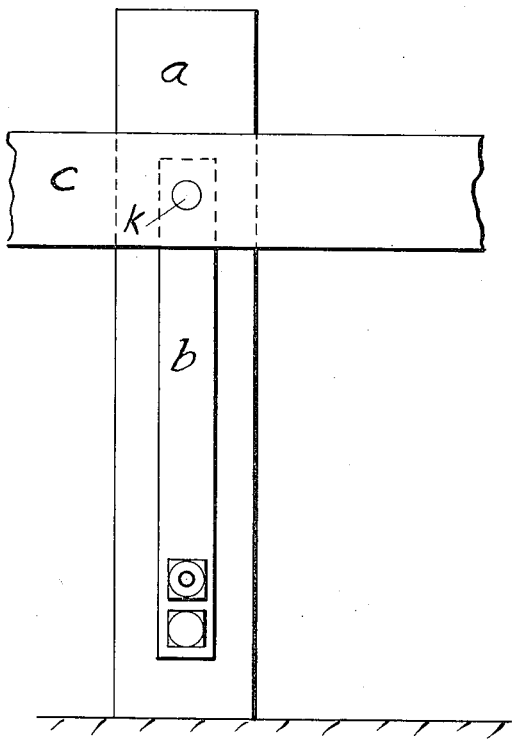
Fig. 2
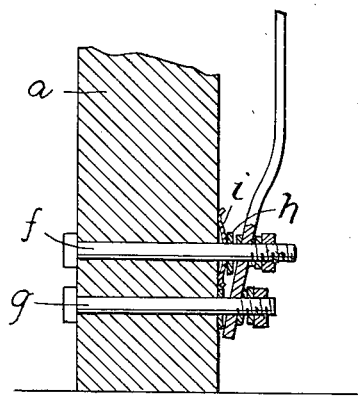
Fig. 3
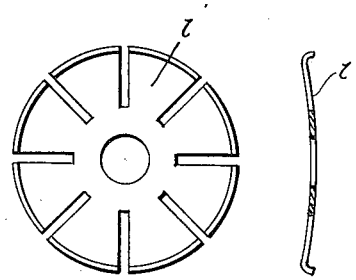
Fig. 1ª   Fig. 1ᵇ
Ethelbert Favary
INVENTOR Patented Aug. 11, 1936

2,050,694

UNITED STATES PATENT OFFICE 2,050,694

ROAD GUARD

Ethelbert Favary, Burbank, Calif.

Application July 3, 1934, Serial No. 733,556

8 Claims. (Cl. 256—13.1)

This invention relates to road guards of the type in which an oblong flat steel spring is attached to a wooden post, the posts being connected with another by guard rails through the springs. The object of my invention is to increase the "give" of the guard rails or the movement or deflection of the spring without increasing the flexure in the spring itself. In the accompanying drawing forming part of this specification, Fig. 1 is a side view, Fig. 2 a front view and Fig. 3 is a portion of a side view in sections of a modified form of road guard embodying my invention; Fig. 1a is a detail of a spring washer. Figure 1b is a cross section of the spring washer shown in Figure 1a. In the different views like letters refer to like parts.

In the figures, $a$ is the post, preferably of wood, which is fastened in the ground, $b$ a flat leaf spring, and $c$ the guard rail. Spring $b$ is attached to the post by means of bolts $f$ and $g$, while the guard rail is attached to the spring by means of bolt $k$. In order to increase the "give" or motion of the guard rail $c$ when it is hit by a moving vehicle, I use a small spring $i$ underneath the nut of bolt $g$. If desired, this small spring $i$ may be made of a small piece of flat spring steel, or it may be a coil spring, which will flex a small amount under pressure. As the guard rail $c$ moves toward the post, spring $b$ will flex, but at the same time there will be a tendency to pull bolt $g$ out of the post and this will cause a small deflection or compression in spring $i$. If the distance between bolts $f$ and $g$, for example, is one-tenth of the distance between $f$ and $k$, it is evident that for a given deflection of small spring $i$, guard rail $c$ will move inward ten times that distance. Said spring $i$ may be made as weak or as strong as desired, and its "give" will take place when the main spring $b$ flexes, thereby enabling the upper end of the main spring $b$ to yield toward the post a greater distance than what it normally would, without a greater flexure in the metal of which it is composed.

Instead of short spring $i$ I may use spring washers $h$ underneath the bolt head or I may use both $i$ and $h$ together, or I may employ a coil spring, whichever may be found most convenient or most efficient in practice. The spring $i$ or the spring washers $h$ may be composed of a washer slotted, as shown in Fig. 1a, or I may use one or more spring lock washers, as are well known in the art, underneath the bolt head, or the lock washers and the spring $i$ may be used in combination, as shown in Fig. 1. I also think it advantageous to use a small spring, a spring washer or a lock washer $h_1$ under the bolt head, or the nut, on the front side of the guard on the outside of $b$ to facilitate the motion of the bottom of the main spring. The hole in post $a$ may be slightly larger than the bolt $g$ to permit free motion of the bolt in the post. Likewise, the hole in the main spring to accommodate bolt $f$ may be slightly larger, for the same purpose. The guard rail $c$ may be made of sheet metal in the shape shown, or it may simply be a cable or wooden planks attached to the upper end of the springs $b$ of the various posts, thereby connecting the posts with one another.

Instead of having a portion of the post cut away, as shown dotted at $j$, I may use an ordinary square post, in which case the distance $e$ in the spring "set-off" may be increased, or the spring may be set further away from the post. However, I believe the construction shown preferable because it will decrease the over-all distance between the exterior of the post and the spring. It is thus seen that for a given flat spring I am enabled to obtain a greater deflection or movement without exceeding the elastic or flexure limit of the steel, because the small spring at the bottom of the post enables the lowest part of the main spring to move slightly away from the post, thus permitting the top to move further inward. Instead of using a flat spring, $b$ may simply be a strong bar, in which case all the "give" or inward motion of guard rail $c$ is obtained from the small spring or spring washers at the bottom of $b$; since the length from $f$ to $k$ is large in comparison with the distance from $f$ to $g$, the upper end of $b$ will move a comparatively large distance for a small "give" in the spring at the bottom. It is evident, of course, that instead of having the lowest end of the spring $b$ move outward, I may place the small spring or spring washers between the main spring and the post, on bolt $f$, as shown in Fig. 3. In this case the lowest end of the spring $b$ will remain in contact with the post, and the small spring $i$ and spring washer $h$ will be compressed when the main spring is deflected toward the post.

Having now described my invention, what I claim as new and desire to protect by Letters Patent is:

1. In a guard rail construction, an abutment member fixed with respect to the ground, a guard rail support attached thereto and mounted for limited relative movement with respect to said abutment member, resisting means effective upon said support for holding the upper portion of the same out of contact with said abutment member, said resisting means adapted to yield under predetermined pressure to permit inward movement of said support toward said abutment member, said support carrying adjacent its upper end a laterally extended guard member.

2. In a guard rail construction, an abutment member fixed with respect to the ground, a guard rail support attached thereto and mounted for limited relative movement with respect to said abutment member, spring resisting means effective upon said support for holding the upper portion of the same out of contact with said abutment member, said spring resisting means adapted to yield under pre-determined pressure to permit inward movement of said support toward said abutment member, said support carrying adjacent its upper end a laterally extended guard member.

3. In a guard rail construction, an abutment member fixed with respect to the ground, a guard rail support attached thereto and mounted for limited rocking movement with respect to said abutment member, resisting means effective upon said support for holding the upper portion of the same in a predetermined position out of contact with said abutment member, said resisting means adapted to yield under predetermined pressure to permit inward movement of said support toward said abutment member, said support carrying adjacent its upper end a laterally extended guard member.

4. In a guard rail construction, an abutment member fixed with respect to the ground, a substantially inflexible guard rail support attached thereto and mounted for limited relative movement with respect to said abutment member, resisting means effective upon said support for holding the upper portion of the same out of contact with said abutment member, said resisting means adapted to yield under predetermined pressure to permit inward movement of said support toward said abutment member, said support carrying adjacent its upper end a laterally extended guard member.

5. In a guard rail construction, an abutment member fixed with respect to the ground, a substantially inflexible guard rail support attached thereto and mounted for limited relative movement with respect to said abutment member, resisting means effective upon the lower portion of said support for holding the upper portion of the same out of contact with said abutment member, said resisting means adapted to yield under predetermined pressure to permit inward movement of said support toward said abutment member, said support carrying adjacent its upper end a laterally extended guard member.

6. In a guard rail construction, an abutment member fixed with respect to the ground, a substantially rigid guard rail support attached thereto and mounted for limited relative movement with respect to said abutment member, spring resisting means effective upon said support for holding the upper portion of the same out of contact with said abutment member, said spring resisting means adapted to yield under pre-determined pressure to permit inward movement of said support toward said abutment member, said support carrying adjacent its upper end a laterally extended guard member.

7. In a guard rail construction, an abutment member fixed with respect to the ground, a substantially inflexible guard rail support attached thereto and mounted for limited rocking movement with respect to said abutment member, resisting means effective upon said support for holding the upper portion of the same in a predetermined position out of contact with said abutment member, said reisisting means adapted to yield under predetermined pressure to permit inward movement of said support toward said abutment member, said support carrying adjacent its upper end a laterally extended guard member.

8. In a guard rail construction, an abutment member fixed with respect to the ground, a substantially inflexible guard rail support attached thereto and mounted for limited rocking movement with respect to said abutment member, resisting means effective upon the lower portion of said support for holding the upper portion of the same in a predetermined position out of contact with said abutment member, said resisting means adapted to yield under predetermined pressure to permit inward movement of said support toward said abutment member, said support carrying adjacent its upper end a laterally extended guard member.

ETHELBERT FAVARY.